United States Patent [19]
Crossland et al.
[11] Patent Number: 4,655,550
[45] Date of Patent: Apr. 7, 1987

[54] FERRO-ELECTRIC LIQUID CRYSTAL DISPLAY WITH STEADY STATE VOLTAGE ON FRONT ELECTRODE

[75] Inventors: William A. Crossland, Harlow; Peter J. Ayliffe, Bishops Stortford, both of England

[73] Assignee: International Standard Electric Corporation, New York, N.Y.

[21] Appl. No.: 663,249

[22] Filed: Oct. 22, 1984

[30] Foreign Application Priority Data

Oct. 26, 1983 [GB] United Kingdom ................ 8328551

[51] Int. Cl.[4] ........................ G02F 1/133; G09G 3/36

[52] U.S. Cl. .................................. 350/332; 340/784; 350/333; 350/350 S

[58] Field of Search .................... 350/332, 350 S, 333; 340/784, 713, 716, 718, 719, 805, 765

[56] References Cited

U.S. PATENT DOCUMENTS 3,936,815 2/1976 Kogure .......................... 350/333 X
3,938,136 2/1976 Kawakami ...................... 350/333 X
3,966,631 6/1976 Toriyama et al. ............. 350/350 R
3,998,557 12/1976 Javan .............................. 350/363 X
4,127,848 11/1978 Shanks ........................... 350/333 X
4,239,346 12/1980 Lloyd ................................... 350/334
4,430,648 2/1984 Togashi et al. ...................... 340/784
4,447,132 5/1984 Zwarte ................................. 350/346
4,511,926 4/1985 Crossland et al. .................. 340/784
4,528,562 7/1985 Crossland et al. .............. 350/350 S

FOREIGN PATENT DOCUMENTS 0032362 7/1981 European Pat. Off. ......... 350/350 S

OTHER PUBLICATIONS

Lechner et al. "Liquid Crystal Matrix Displays" Proc. of IEEE, vol. 59, No. 11, Nov. 1971, pp. 1566–1579.

*Primary Examiner*—John K. Corbin
*Assistant Examiner*—David Lewis
*Attorney, Agent, or Firm*—T. L. Peterson; J. M. May

[57] ABSTRACT

A ferro-electric liquid crystal display in which the individual pixels are addressed via an address matrix that includes one field effect transistor for each pixel, and a plurality of row and column conductors whereby data is written into each pixel to change or to maintain its display condition.

11 Claims, 7 Drawing Figures

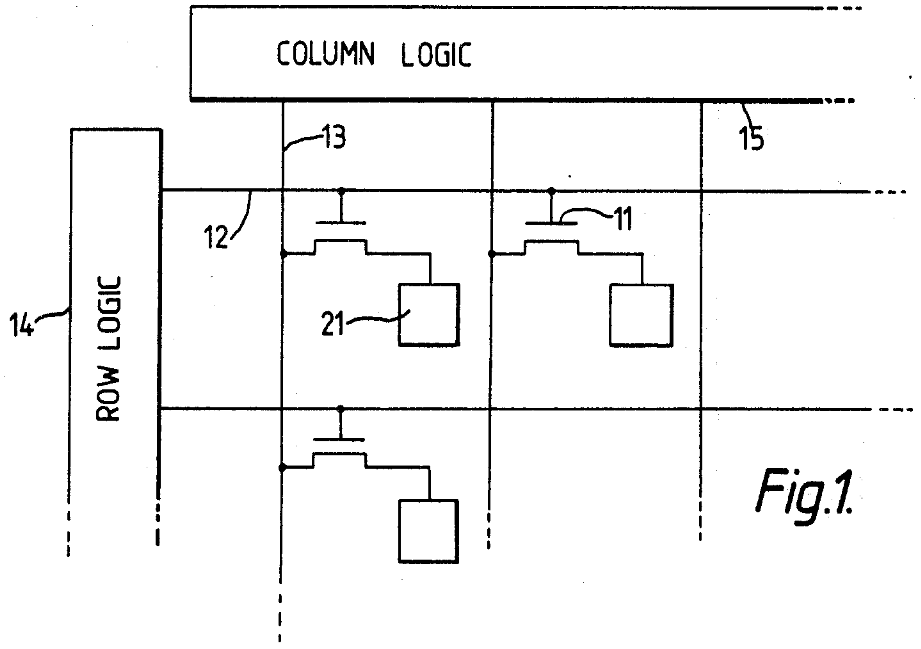
Fig.1.
Fig.2.
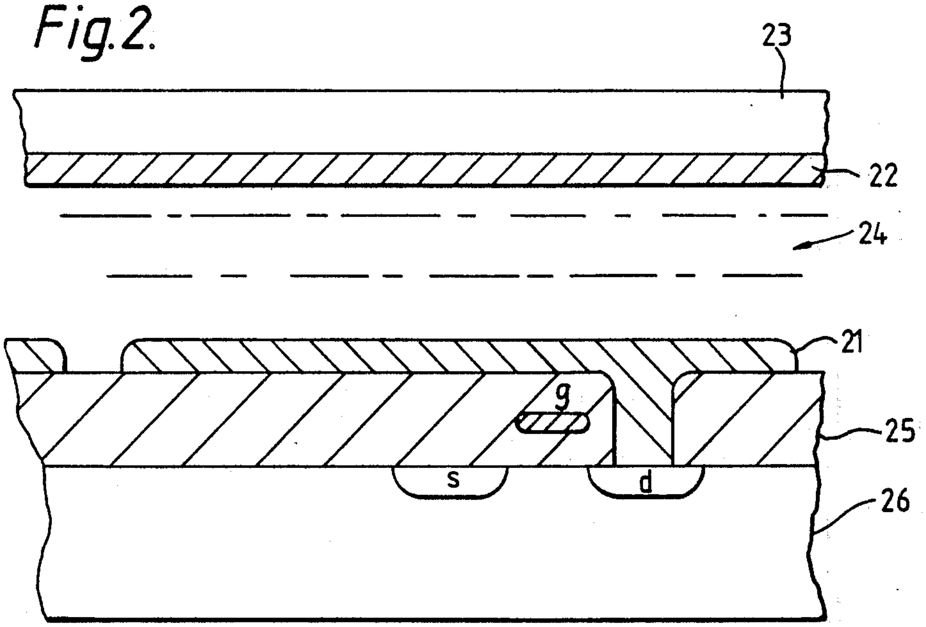

FERRO-ELECTRIC LIQUID CRYSTAL DISPLAY WITH STEADY STATE VOLTAGE ON FRONT ELECTRODE

BACKGROUND OF THE INVENTION

This invention relates to the addressing of matrix array type ferro-electric liquid crystal display devices.

Hitherto dynamic scattering mode liquid crystal display devices have been operated using a d.c. drive or an a.c. one, whereas field effect mode liquid crystal devices have generally been operated using an a.c. drive in order to avoid performance impairment problems associated with electrolytic degradation of the liquid crystal layer. Such devices have employed liquid crystals that do not exhibit ferro-electricity, and the material interacts with an applied electric field by way of an induced dipole. As a result, they are not sensitive to the polarity of the applied field, but respond to the applied RMS voltage averaged over approximately one response time at that voltage. There may also be frequency dependence as in the case of so-called two-frequency materials, but this only affects the type of response produced by the applied field.

In contrast to this, a ferro-electric liquid crystal exhibits a permanent electric dipole, and it is this permanent dipole which will interact with an applied electric field. Ferro-electric liquid crystals are of interest in display applications because they are expected to show a greater coupling with an applied field than that typical of a liquid crystal that relies on coupling with an induced dipole, and hence ferro-electric liquid crystals are expected to show a faster response. A ferro-electric liquid crystal display mode is described for instance by N. A. Clark et al. in a paper entitled 'Ferro-Electric Liquid Crystal Electro-Optics Using the Surface Stabilized Structure' appearing in Mol. Cryst. Liq. Cryst. 1983 volume 94 pages 213 to 234. Two properties of ferro-electrics set the problems of matrix addressing such devices apart from the addressing of non-ferro-electric devices. First they are polarity sensitive, and second their response times exhibit a relatively weak dependence upon the applied voltage. The response time of a ferro-electric is typically proportional to the inverse square of applied voltage, or even worse, proportional to the inverse single power of the voltage; whereas a non-ferro-electric smectic A, which in certain other respects is a comparable device exhibiting long term storage capability, exhibits a response time that is typically proportional to the inverse fifth power of the voltage.

The use of ferro-electric displays is therefore restricted by difficulties in addressing the display. If such a display is addressed via a conventional X–Y matrix, then interference analogous to cross-talk prevents the minimum response time from being achieved. Application of a signal to a row or column of a display can cause changes in the state of pixels other than the particular one being addressed.

SUMMARY OF THE INVENTION

According to the invention there is provided an address matrix for a ferro-electric liquid crystal display which minimizes or overcomes the above disadvantage. This address matrix includes an array of field effect transistors, one transistor for each pixel of the display whereby that pixel may be switched between its two stable conditions. This address matrix also includes row and column conductors coupled respectively to the gates of a row of transistors and the sources of a column of transistors, and logic means whereby the transistors are selectively enabled.

The address matrix of the invention overcomes the 'crosstalk' problems experienced with prior art devices by providing gating means whereby voltages are applied selectively only to those pixels of the display that are to be accessed. This in turn allows an increase in both the operational speed and the complexity of the display.

DESCRIPTION OF THE DRAWINGS

Other objects and advantages of the present invention will be apparent from the following desciption and drawings, in which:

FIG. 1 is a schematic diagram of one embodiment of an address matrix of a ferro-electric liquid crystal display;

FIG. 2 is a cross-sectional view of one cell of the display of FIG. 1;

DESCRIPTION OF THE PREFERRED EMBODIMENTS

Figure 3:
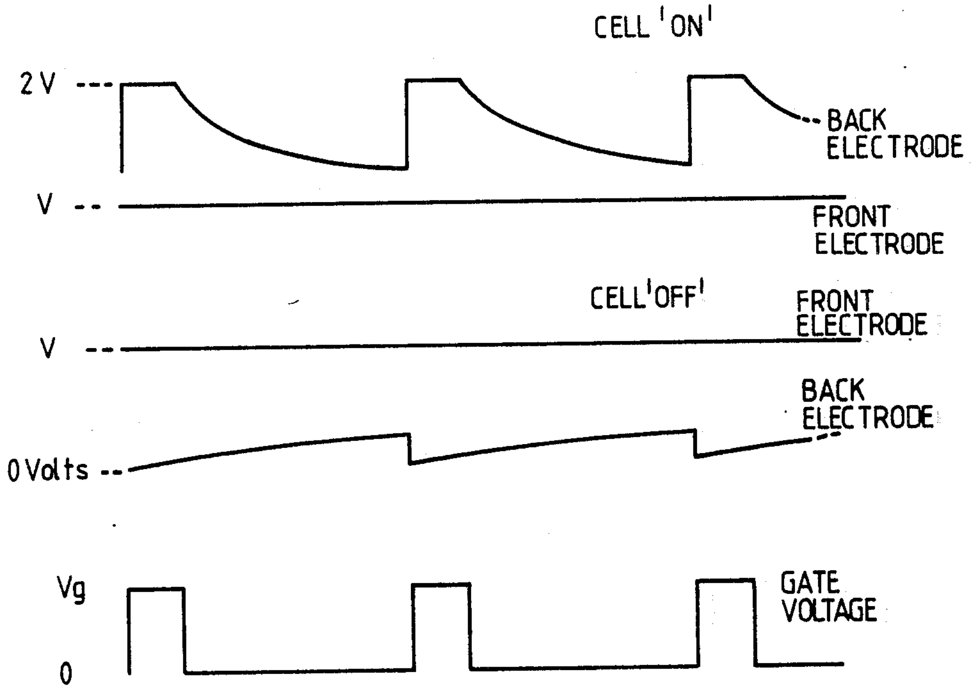
FIGS. 3 and 4 illustrate the pulse sequences that are employed in the addressing of the cells of the matrix of FIG. 1.

Referring to FIG. 1, the address matrix of the display comprises a plurality of field effect transistors 11, one for each pixel of the display, disposed in a rectangular array of rows and columns. Electrical interconnection of the transistors 11 is provided by row conductors 12 providing a common connection to the gate electrodes of each transistor row, and column conductors 13 providing a common connection to the sources of each transistor column. Selection of a particular pair of row and column conductors to drive a corresponding transistor 11 at the cross-point of those conductors is effected by row and column address logic circuits 14 and 15 respectively.

As shown in FIG. 2, each cell or pixel of the display includes a back electrode 21 coupled to the drain of the transistor 11, and a transparent front electrode 22 supported on a transparent, e.g., glass, cover plate 23. A ferro-electric liquid crystal material 24 is disposed between the two electrodes. The bank electrode 21 is supported on a silicon dioxide layer 25 disposed on the surface of a silicon substrate 26 in which transistors 11 are formed. The gate of the transistor is formed in the silica layer 25.

Typically, a cell is operated by applying a steady voltage V to the front electrode and driving the back electrode to a voltage 2 V or to zero volts to switch the cell between its two stable conditions, i.e., the back electrode is taken to a voltage V above or below the front electrode voltage.

Figure 4:
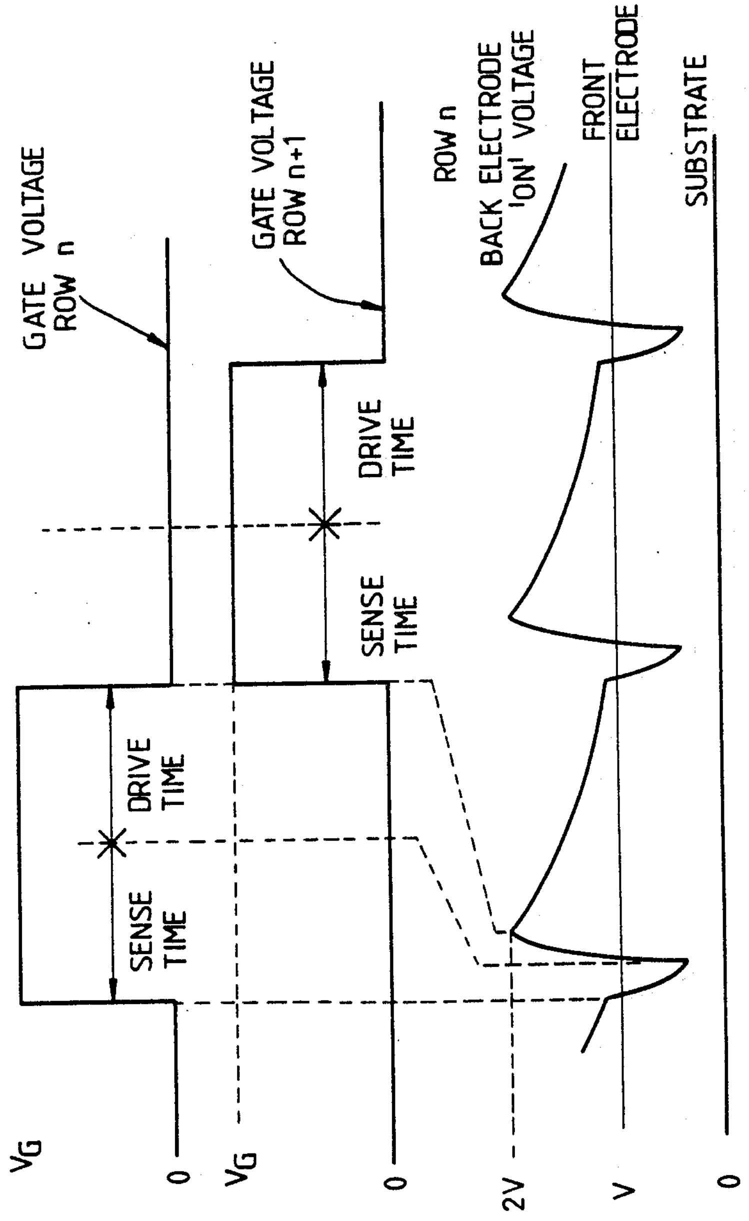

The pulse sequences involved in addressing the matrix are shown in FIGS. 3 and 4. The front electrode of each cell is maintained at a steady voltage V relative to the display substrate which may be earthed. The cell rows are addressed in sequence by the application of a rectangular gate pulse to the corresponding row conductor thus switching all the transistors of that row on. At the same time data signals are fed in parallel to the column conductors in the form of a logic ONE or ZERO according to the desired state of the particular cell to be addressed. In the following time slot a gate pulse is applied to the next row of cells and the sequence is repeated.

After the cell has been addressed, and until the next addressing cycle, data written into each cell is stored in the form of a charge on the back electrode. As both the cell and transistor have a small resistive leakage this charge slowly leaks away so that the potential of the back eletrode drifts towards that of the front electrode. This process is slow compared with the time needed for writing data and displays having up to 1000 lines can be addressed in this way without difficulty.

Figure 5:
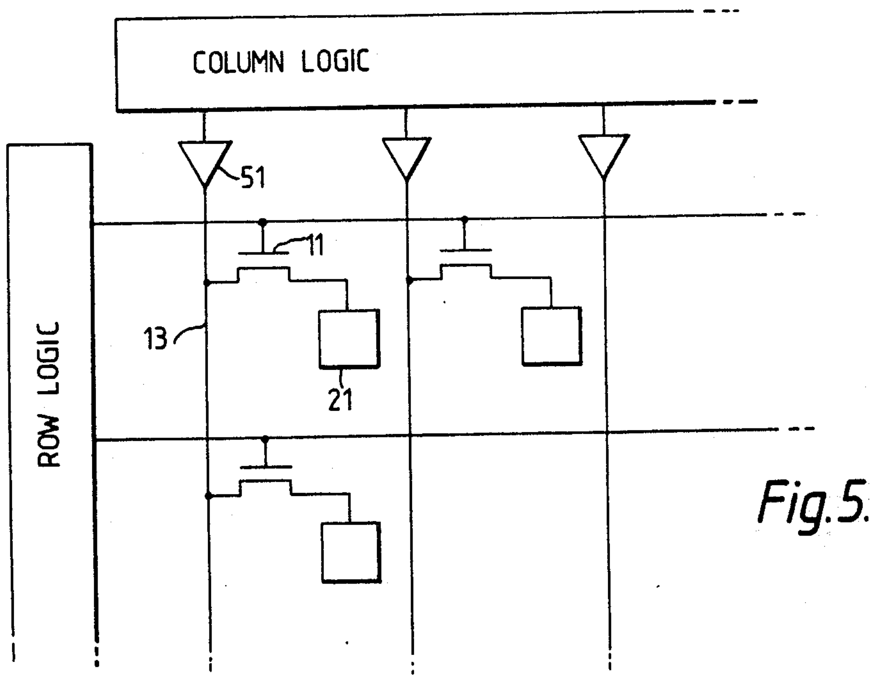
FIG. 5 shows an alternative embodiment of an address matrix.

Application of a steady voltage to any liquid crystal can be undesirable due to electrochemical degradation of the material. As the ferro-electric material has in effect a memory, it is not necessary to drive a cell continuously. An address matrix which does not require the application of a steady voltage to the cells of the display is shown in FIG. 5. In this arrangement the cells are arranged in rows and columns as before but each column conductor 13 is accessed via a sense amplifier 51. This provides for self refreshing of the display.

Figure 6:
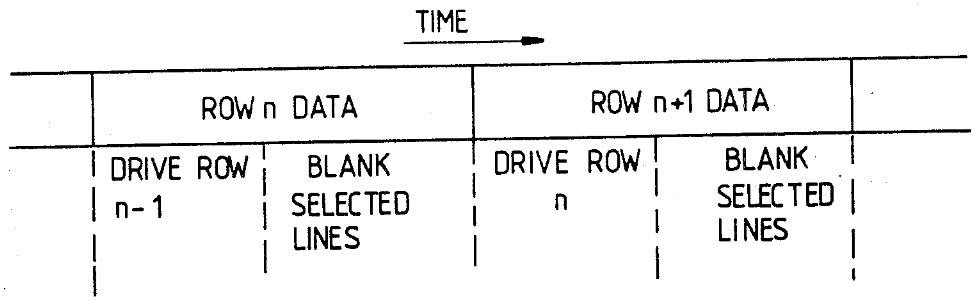
FIGS. 6 and 7 illustrate the pulse sequences that are employed in the addressing of the cells of the matrix of FIG. 5.
Figure 6:
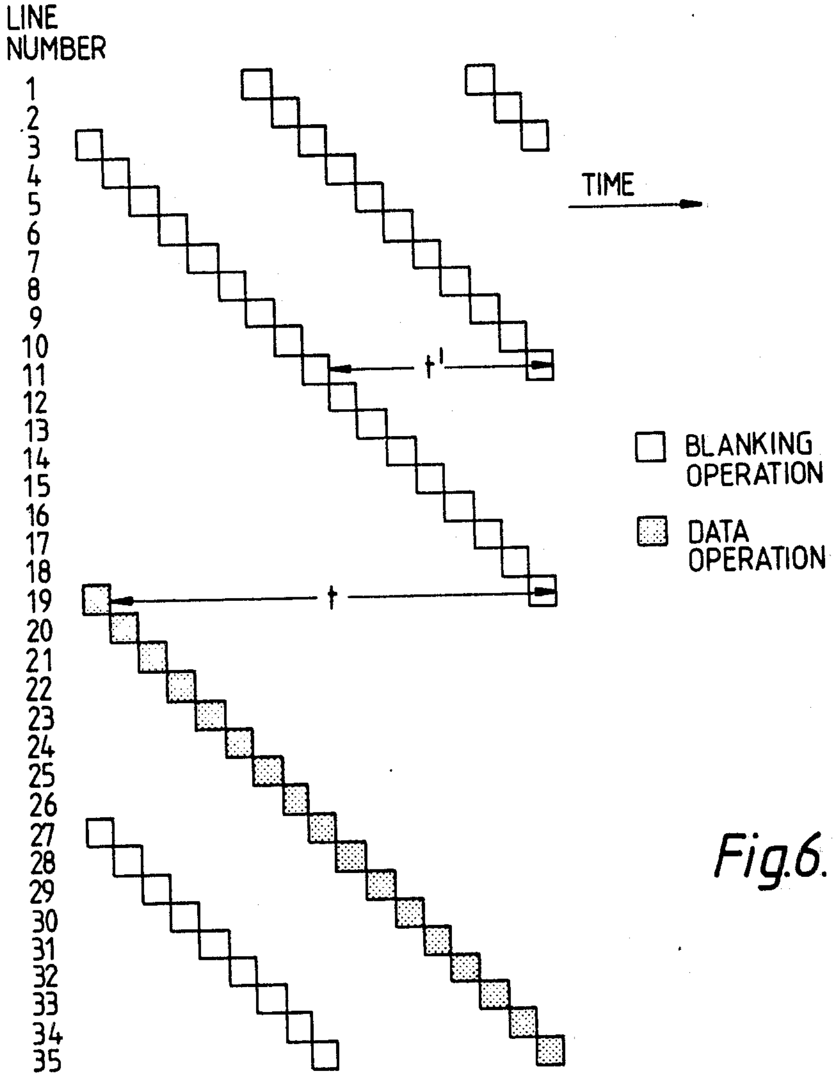
Figure 7:
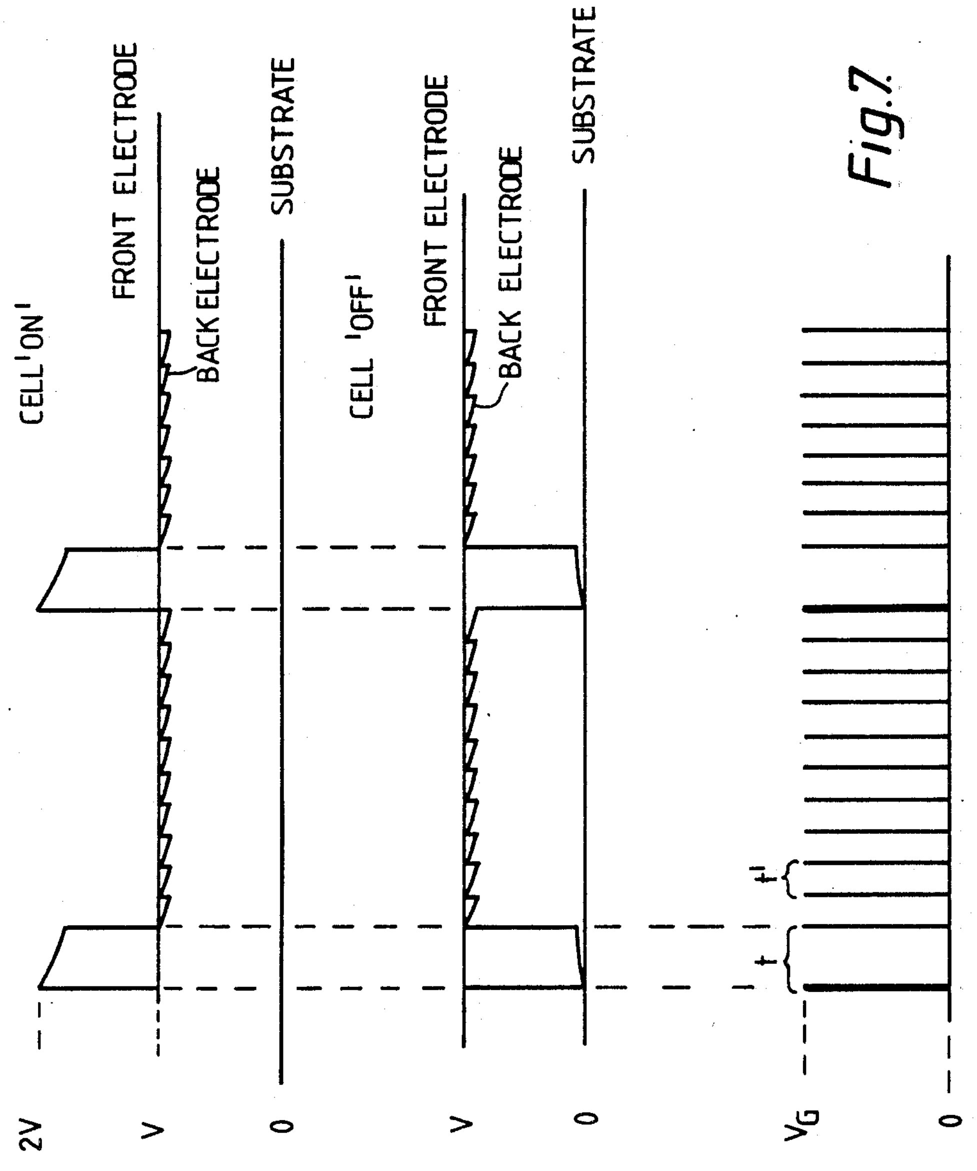

An address sequence for use with the arrangement of FIG. 5 and which does not require the application of a continuous voltage to the cells of the display is shown in FIGS. 6 and 7. In this sequence the duration of the address pulse $V_G$ (FIG. 7) of each row is divided into two portions. During the first portion of the pulse the state of each cell is read by the corresponding sense amplifier 51 and the cell is refreshed either to its 'on' or its 'off' condition. During the second part of the address, pulse data is written into only those cells whose state is to be changed. The sequence is then repeated for the next line of the display and so on. Because the pixels of each row are refreshed in parallel this arrangement provides a very high equivalent data rate. This in turn allows relatively complex displays to be used. In this arrangement all the cells on a particular row are first refreshed via the sense amplifiers and then data is written into those cells of that row whose state is to be changed. In a modification of this technique the display is regularly refreshed on a row by row basis using the sense amplifiers. At certain times during this process (once every n lines where n*1) new data is written into the display, but not necessarily at the same row that has just been refreshed. This allows for random access. To write in new data the line is refreshed as before, but at the required points on the line the information from the sense amplifiers is over-ridden by the new data during the drive time. As can be seen from FIG. 6 a drive voltage is applied to the cell back electrode only for a relatively short time t, this time being greater than the response time of the ferro electric material. Drift of the back electrode voltage towards the sustrate voltage is prevented by periodically returning the back electrode voltage to the front electrode voltage V. The cycle time for this latter operation is t' where t' may conveniently be approximately one half of the drive time t. In this gate pulse sequence of FIG. 6 it should be noted that the pulses indicated by heavy lines correspond to data pulses, the remaining pulses of the sequence corresponding to blanking pulses.

What is claimed is:

1. A ferro-electric liquid crystal display comprising:

a. a transparent front plate,
b. a transparent front electrode supported by the front plate,
c. a silicon substrate,
d. a plurality of back electrodes supported by the substrate, said back electrodes and said front electrode and said front electrode together defining a plurality of liquid crystal cells,
e. a plurality of row conductors,
f. a plurality of column conductors,
g. a plurality of field effect transistors each having first, second and third electrodes,
h. means for connecting the first electrodes of the transistors to predetermined back electrodes,
i. means for connecting the second electrodes of the transistors of predetermined ones of the row electrodes,
j. means for connecting the third electrodes of the transistors to predetermined ones of the column electrodes, (and)
k. means for applying a steady state voltage to said front electrode,
l. logic means coupled to the row and column electrodes for controlling the transistors and thereby controlling states of said cells by temporarily storing charges on the selected ones of said back electrodes indicative of the last states which the logic means established in the associated cells, said logic means including means for sequentially applying to said row conductors alternating ones of a ground voltage and a voltage twice the voltage of said steady state voltage and means for applying data pulses to said column conductors
m. a ferroelectric liquid crystal material.

2. The display of claim 1 in which said cells are refreshed sequentially on a row by row basis.

3. The display of claim 1 in which the establishment of a particular state in a cell represents the writing of data into that cell by the logic means.

4. The display of claim 3 in which the logic means is adapted to provide data to a cell only when the state of that cell is to be changed.

5. The display of claim 1 in which the sources and drains of the transistors are formed in said substrate.

6. The display of claim 5 including a silicon dioxide layer between the substrate and the back electrodes.

7. The display of claim 6 in which the gates of the transistors are located within the silicon dioxide layer.

8. A ferro-electric liquid crystal display utilizing a liquid crystal material having bistable characteristics, said display comprising:

a. a transparent front plate,
b. a transparent front electrode supported by the front plate,
c. a silicon substrate,
d. a plurality of back electrodes supported by the substrate, said back electrodes and said front electrode together defining a plurality of liquid crystal cells,
e. a plurality of row conductors,
f. a plurality of column conductors,
g. a plurality of field effect transistors each having first, second and third electrodes,
h. means for connecting the first electrodes of the transistors to predetermined back electrodes,
i. means for connecting the second electrodes of the transistors to predetermined ones of the row electrodes, j. means for connecting the third electrodes of the transistors to predetermined ones of the column electrodes, and k. logic means coupled to the row and column electrodes for controlling the states of said cells by temporarily storing charges on the selected ones of said back electrodes indicative of the last states which the logic means established in the associated cells, l. refresh means for periodically restoring said charges to their initial values and thereby refreshing said cells, said refresh means including a sensing amplifier connected to each of the column conductors, m. means within said logic means for providing an address pulse to said row column conductors so that during a first portion of said pulse, said sensing means senses the state of each cell said refreshing means refreshes the state of each cell, n. other means within said logic means for providing data to said column conductors so that during a second portion of said pulse data is written into only those cells whose state is to be changed, and o. a ferroelectric liquid crystal material.

9. The display of claim 8 in which the sources and drains of the transistors are formed in said substrate.

10. The display of claim 9 including a silicon dioxide layer between the substrate and the back electrodes.

11. The display of claim 10 in which the gates of the transistors are located within the silicon dioxide layer.

* * * * *